United States Patent [19]

Kamo et al.

[11] Patent Number: 5,746,916
[45] Date of Patent: May 5, 1998

[54] MICROPOROUS MEMBRANE MADE OF NON-CRYSTALLINE POLYMERS AND METHOD OF PRODUCING THE SAME

[75] Inventors: Jun Kamo; Seiya Koyanagi; Miho Kawai, all of Otake, Japan

[73] Assignee: Mitsubishi Rayon Co., Ltd., Tokyo, Japan

[21] Appl. No.: 377,706

[22] Filed: Jan. 25, 1995

[30] Foreign Application Priority Data

Jan. 26, 1994 [JP] Japan ................................ 6-023430
Feb. 8, 1994 [JP] Japan ................................ 6-014324

[51] Int. Cl.$^6$ ........................... B01D 33/21; B29C 65/00
[52] U.S. Cl. ........................... 210/500.23; 210/500.39; 210/500.35; 210/500.41; 264/41; 264/49
[58] Field of Search ................... 264/41, 49; 210/500.41, 210/500.23, 500.39, 500.35

[56] References Cited

U.S. PATENT DOCUMENTS

| | | | |
|---|---|---|---|
| 3,407,249 | 10/1968 | Landi | 264/49 |
| 4,356,234 | 10/1982 | Kumakawa et al. | 428/372 |
| 4,867,881 | 9/1989 | Kinzer | 210/490 |
| 5,084,173 | 1/1992 | Nitadori et al. | 210/500.42 X |

FOREIGN PATENT DOCUMENTS

| | | |
|---|---|---|
| 54-71785 | 6/1979 | Japan . |
| 56-115602 | 9/1981 | Japan . |
| 63-56802 | 11/1988 | Japan . |
| 3-42025 | 2/1991 | Japan . |
| 3-42052 | 2/1991 | Japan . |
| 5-137982 | 6/1993 | Japan . |

*Primary Examiner*—Ana Fortuna
*Attorney, Agent, or Firm*—Cushman Darby & Cushman IP Group of Pillsbury Madison & Sutro, LLP

[57] ABSTRACT

A microporous membrane made of a non-crystalline polymer having, within its wall, microfibrils and slit-like micropores which are oriented in the lengthwise direction of the membrane, said slit-like micropores communicating from one surface to the other surface of the membrane, and forming a stacked construction. This membrane has a high flux value of AFR and WFR, excellent heat-, solvent-, and pressure-resistance, and a high mechanical strength, and does not contain any undesirable materials which eluate during use. This membrane is thus useful as a multi-purpose separation membrane, such as for medical uses, food industries, purification of water or air, and the separation of hot liquids.

13 Claims, 2 Drawing Sheets

10 μm

10 μm

10 μm

10 μm

10 μm

10 μm

MICROPOROUS MEMBRANE MADE OF NON-CRYSTALLINE POLYMERS AND METHOD OF PRODUCING THE SAME

BACKGROUND OF THE INVENTION

1. Field of the Invention

The present invention relates to a microporous membrane made of a non-crystalline polymer and a method of producing the same. More particularly, the present invention relates to a microporous membrane, for example, a microporous hollow fiber membrane, made of a non-crystalline polymer, having many micropores, which communicate from one surface of the membrane to its other surface, and a method of producing it by a melt formation at a specific deformation rate. The membrane of the present invention does not contain any undesirable materials which will elute during its use, and thus it is effectively used as a separation membrane for various liquid treatments, such as a separation membrane for producing ultra-pure water, a separation membrane for blood or plasma, a separation membrane for water used in nuclear-power generation or thermal-power generation, and a separation membrane for other water treatments.

2. Description of the Related Art

As the microporous membrane for the liquid treatments stated above, a microporous membrane made by a melt spinning process of a crystalline polymer, such as polyethylene or fluorine polymers, and a microporous membrane made, by dissolving in a solvent, a non-crystalline polymer such as a polysulfone, a methylmethacrylate-type polymer, polyimide, and polyarylate, and then by subjecting it to the wet spinning process have been known.

U.S. Pat. No. 4,401,567 discloses a polyethylene microporous hollow fiber membrane containing many micropores formed by microfibrils that are oriented in the lengthwise direction of the membrane and stacked lamella formed in a direction perpendicular to said lengthwise direction, and which communicate from one surface of the membrane to its other surface. It also disclosed that this membrane was made by first melt-forming polyethylene into a hollow fiber using a spinneret having a double tubular construction, annealing it, and then stretching it. This microporous hollow fiber does not contain undesirable materials which will elute into a liquid to be treated, and thus it is advantageously used in medical or food industries. This hollow fiber, however, is not appropriate to separate a liquid having a temperature higher than about 80° C., since the microporous structure within the hollow fiber is destroyed after the separation and its permeability seriously decreases.

Japanese Laid-open Patent Publication No. Hei. 3-42025 discloses the production of polyolefine porous hollow fibers by melt-spinning a mixture of a polyolefin resin, an organic liquid material having a specific solubility parameter of from 8.4 to 10.5 such as diethyl phthalates and an inorganic fine powder material such as hydrophobic silica, and then extracting, by dipping in an organic solvent such as trichloroethane, the organic liquid and the inorganic fine powder material from the hollow fiber. This hollow fiber, however, is insufficient in its heat resistance, and it has a problem in that a minute amount of diethyl phthalate and the extracting solvent, which are undesirable, tend to remain in the hollow fiber.

Heat-resistant microporous membranes made of non-crystalline polymers, such as polysulfone or polyimide super-engineering plastics, have been known. However, since these super-engineering plastics may not be formed into a molecular-oriented hollow fiber precursor, it may not be formed into a microporous hollow fiber membrane by the stretching perforation method. Thus, from these plastics, a microporous hollow fiber membrane is formed by first making a solution of it with appropriate solvents, and then subjecting the solution to a wet spinning.

Japanese Laid-open Patent Publication No. Sho. 56-115602 discloses the production of a microporous hollow fiber membrane having a nonsymmetrical structure made by subjecting a solution of polysulfone and a solvent to a wet spinning. This microporous membrane has relatively-fine skin layers at its inner and outer surfaces and a structure of bundled tubes.

Japanese Patent Publication No. Sho. 63-56802 discloses the production of a microporous hollow fiber membrane by subjecting a solution of polysulfone and an organic solvent to a dryjet wet spinning. The hollow fiber membrane obtained has slit-like micropores on the inner surface, skin layers on the outer surface, and a microporous structure within the membrane.

Japanese Laid-open Patent Publication No. Hei. 5-137982 discloses the production of a microporous hollow fiber membrane by subjecting a solution of polysulfone and an organic solvent to a dryjet wet spinning. This membrane has a microfibril structure on its outer surface and a microporous structure having many micropores within the membrane.

Japanese Laid-open Patent Publication No. Hei. 5-137982 also discloses the production of a microporous hollow fiber membrane by subjecting a solution of polysulfone and an organic solvent to a wet spinning method. This membrane has a microfibril structure on the outer surface and a microporous structure having many micropores within the membrane.

Japanese Laid-open Patent No. Sho. 54-71785 discloses the production of a planar porous membrane by subjecting a solution of polyimide and an organic solvent to a wet spinning method. This membrane has skin layers on the surfaces and a microporous structure within the membrane.

The above-stated microporous membranes, obtained by subjecting a solution of a heat-resistant polymer and an organic solvent to a wet spinning or a dryjet wet spinning, are heat-resistant and are solvent-resistant, and exhibit high flux values. However, these membranes have a relatively weak mechanical strength, of about 62 kg/cm$^2$ at most, and thus they require careful handling. In addition, the problem of the organic solvent remaining in the membranes has not been resolved, and thus their applications are limited for safety reasons.

SUMMARY OF THE INVENTION

It is an objective of the present invention to provide a heat-resistant and solvent-resistant microporous membrane made of a non-crystalline polymer which has a mechanical strength of higher than 100 kg/cm$^2$ and a high flux value, but which does not contain an undesirable residual organic solvent.

The inventors of the present invention have conducted extensive studies and experiments, and have found that the microporous membrane made of a non-crystalline polymer which satisfies the requirements above may be made by stretching, under a specific condition, a melt-formed material consisting of a non-crystalline polymer and fine particles having a specific particle size.

The present inventions are 1) a novel microporous membrane, such as a microporous hollow fiber membrane, made of a non-crystalline polymer having, within its wall, microfibrils and slit-like micropores which are oriented in the lengthwise direction of the membrane, said slit-like micropores communicating from one surface to the other surface of the membrane, and forming a stacked construction; and 2) a method of producing the same.

DESCRIPTION OF THE PREFERRED EMBODIMENTS

Figure 1:
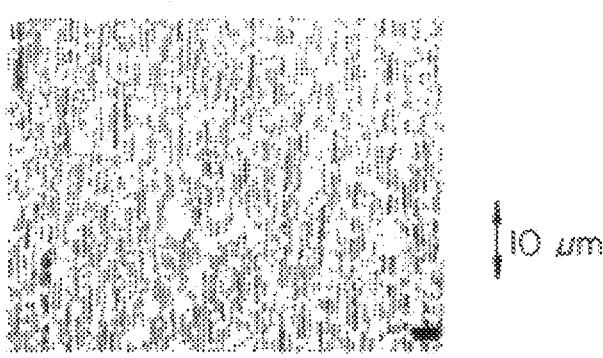
FIG. 1 is a scanning electron photomicrograph (×1,000) showing the outer wall surface of the polysulfone microporous hollow fiber membrane obtained in Example 1.

The non-crystalline polymer as used in the present invention means a non-crystalline polymer which is generally called a non-crystalline polymer. Both a polymer which may not crystallize and a polymer which may crystallize, but only to a small degree of crystallization, are included within the meaning of the non-crystalline polymer.

Any polymer which is generally called a non-crystalline polymer may be used, and examples of this non-crystalline polymer include super-engineering plastics (such as polysulfone, polyimide and polyarylate), engineering plastics (such as polycarbonate and polyphenylene oxide), and general-purpose plastics (such as polystyrene and polymethylmethacrylate). To obtain a membrane with an excellent heat-resistance, super-engineering plastics are preferably used as a starting material. To obtain a membrane with an excellent solvent-resistance, polymide or polyarylate is preferably used as a starting material.

The polysulfone as used in the present invention means a non-crystalline polymer which has a repeating unit containing —SO₂ group in the molecule. Examples of the polysulfone include a polysufone represented by the general formula (1), a polyethersulfone represented by the general formula (2), a polyallylsulfone represented by the general formula (3), a polyphenylenesulfideoxidesulfone represented by the general formula (4), and a polymer of a compound represented by the general formula (5).

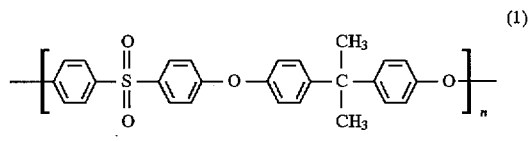

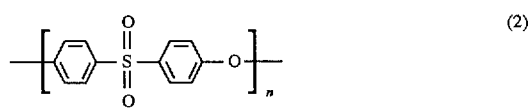

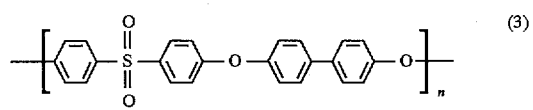

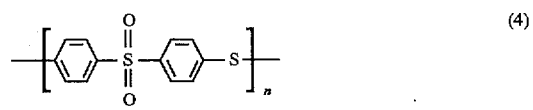

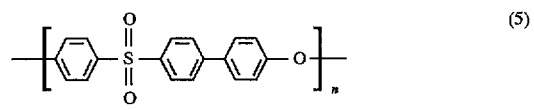

The non-crystalline polymide as used in the present invention means a non-crystalline polymer which has a repeating unit containing an imide group in the molecule. Examples of the non-crystalline polyimide include a polyimide represented by one of the general formulas (6) to (9), a polyetherimide represented by the general formula (10), and a polyamide-imide represented by the general formula (11).

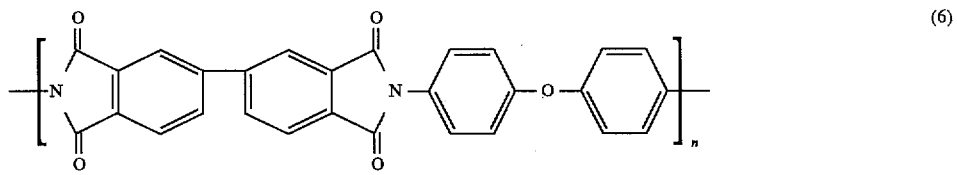

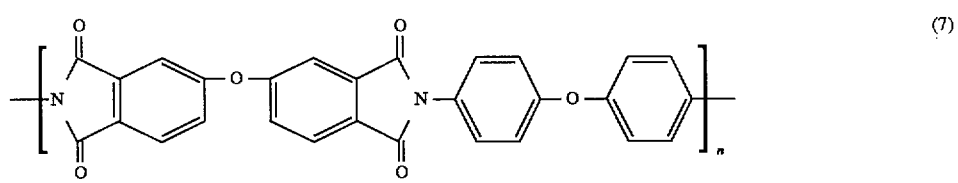

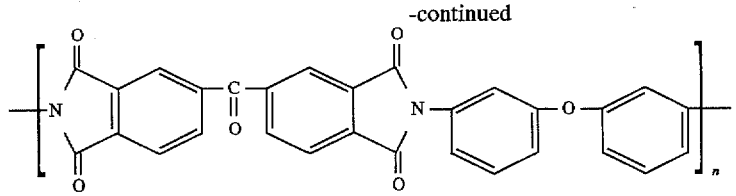 (8)

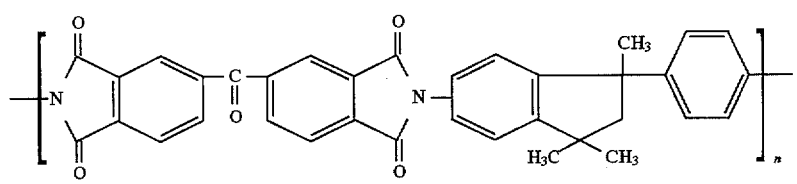 (9)

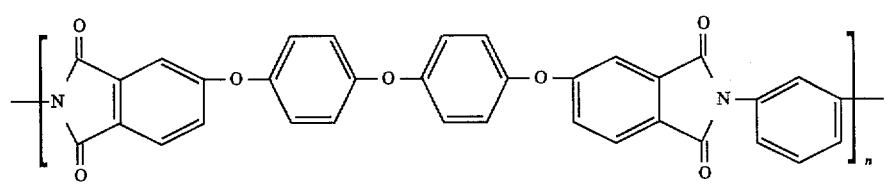 (10)

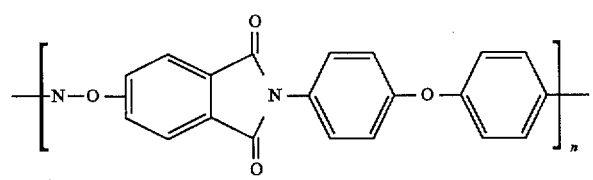 (11)

Examples of the non-crystalline polyarylate as used in the present invention include a non-crystalline aromatic polyester represented by the general formula (12) such as "U polymer" manufactured by UNICHIKA K.K., "Ardel," manufactured by Union Carbide, "APE," manufactured by Bayer, "Durel" manufactured by Ceranies, and "Arylon" manufactured by Du Pont K.K. or "NAP resin" represented by the general formula (13) which is manufactured by Kanegafuchi Kagaku K.K.

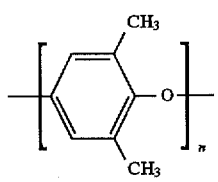 (15)

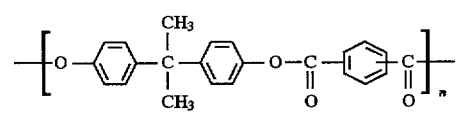 (12)

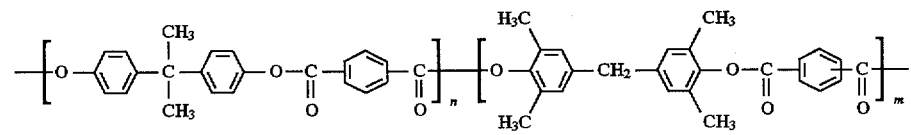 (13)

The non-crystalline polycarbonate as used in the present invention means a non-crystalline aromatic polycarbonate ester represented by the general formula (14).

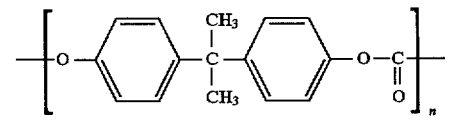 (14)

The non-crystalline polyphenyleneoxide as used in the present invention means a non-crystalline aromatic polyether represented by the general formula (15). A modified polyphenylene oxide which is modified by blending a high-impact polystyrene to improve the processability may be used.

The non-crystalline polystyrene as used in the present invention means a non-crystalline atactic polystyrene obtained by any usual free radical polymerization of styrene.

The non-crystalline methylmethacrylate-type polymer as used in the present invention means an atactic polymethylmethacrylate. Other copolymerizable monomers may be copolymerized in this polymer.

The above polymers are examples of the non-crystalline polymer as used in the present invention, and any polymer containing, as the major component, one or more of the polymers explained above, may be used in the present invention. For example, a copolymer of a polysulfone-polyarylate copolymer represented by the general formula (16), a copolymer of a polysulfone-polycarbonate copolymer represented by the general formula (17), a polysulfone imide represented by the general formula (18), and a copolymer of a polyester-polycarbonate represented by the general formula (19), may be used in the present invention.

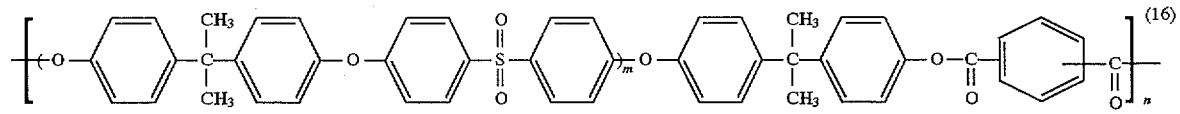

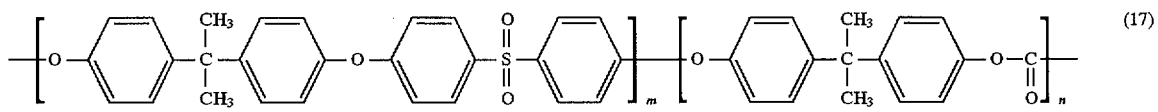

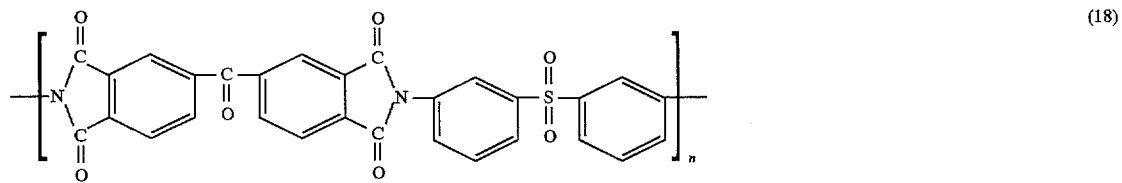

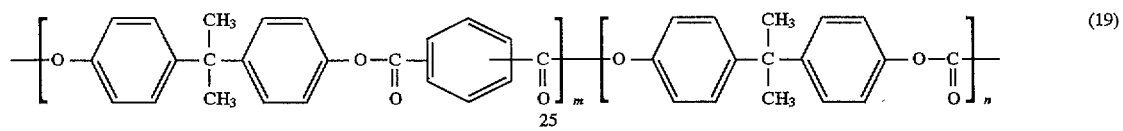

Although the microporous membrane of the present invention is made of a non-crystalline polymer, it has a stacked construction having rectanglar micropores formed by microfibrils that are oriented in the lengthwise direction, wherein the micropores communicate from the one surface to the other surface of the membrane. Because of this construction in the membrane of the present invention, the membrane of the present invention has a higher flux value and a higher mechanical strength than those of the nonsymmetrical membrane produced by the wet spinning method.

The microporous membrane of the present invention has microfibrils that are oriented in the lengthwise direction of the membrane, and slit-like micropores are formed between the microfibrils. Each microfibril preferably has a diameter of from 0.05 to 5 μm and a length of from 0.2 to 100 μm. To obtain a membrane which has a high flux value as well as a high mechanical strength, the diameter of each microfibril should preferably be from 0.1 to 3.0 μm and its length should preferably be from 0.5 to 50 μm.

The slit-like micropores are also oriented in the lengthwise direction of the membrane, are stacked in the direction of the thickness of the membrane, and communicate from the one surface of the membrane to the other surface. The membrane of the present invention has a homogenous structure in the direction of its thickness.

The slit-like micropores should preferably have an average width of from 0.01 to 10 μm, and more preferably from 0.1 to 5 μm. They should preferably have an average length of from 0.05 to 50 μm, and more preferably from 0.5 to 50 μm. If the width and the length of the micropores fall under these ranges the membrane has a high flux value, a high separation power, and a good mechanical strength.

The ratio of the average length to the average width of the slit-like micropores is not specifically limited in the present invention. This ratio, however, should preferably be not less than 3, more preferably not less than 5, and most preferably not less than 8, in order to obtain a membrane having a good mechanical strength.

The tensile break strength of the membrane of the present invention has a high value, of not less than 100 kg/c m². If a polysulfone, a polyimide, a polyarylate and a PMMA are used as the non-crystalline polymer, the tensile break strength will be not less than 130 kg/c m², not less than 200 kg/c m², not less than 130 kg/c m², and not less than 400 kg/c m², respectively. If necessary, these values of the tensile break strength may be increased to values of not less than 150 kg/c m² in case of polysulfone, not less than 250 kg/c m² in case of polyimide, not less than 150 kg/c m² in case of polyarylate, and also not less than 500 kg/c m² in case of PMMA.

The membrane of the present invention may contain fine particles having an average particle size of from 0.01 μm to 10 μm in an amount of not more than 60 wt. %, and preferably from 10 to 60 wt. %. The membrane containing the fine particles in an amount of not more than 60 wt. % has a higher heat-resistance than that of a membrane that does not contain the fine particles.

The fine particles as used in the present invention may be any kind of organic or inorganic particles, if they have an average particle size of from 0.01 to 10 μm. Examples of the inorganic fine particles are fine particles of calcium carbonate, calcium oxide, magnesium oxide, titanium dioxide, silica, alumina, aluminum sulfate, barium sulfate, talc and clay. Examples of the organic fine particles are fine particles of a polyamide resin, a benzoguanamin resin, a melamine resin, a crosslinked polystyrene resin, a methylmethacryate-type resin, a crosslinked silicone resin, and a crosslinked rubber.

The surface of the fine particles may be treated in order to improve the dispersion of the fine particles in the non-crystalline polymer.

The porosity of the membrane of the present invention should preferably be from 10 to 90% in view of the separation function.

The shape of the membrane may take any form, but a hollow fiber membrane and a planar membrane are generally used. Any appropriate shape may be employed in response to the field in which it will be applied.

The membrane of the present invention may take a composite structure wherein on at least one surface of a microporous layer (layer a) having a separation function, another microporous layer (layer b) having a reinforcing function is applied. The slit-like micropores in the separation layer a have an average length of from 0.05 to 50 μm, an average width of from 0.01 to 10 μm, and a ratio of the average length to the average width of not less than 3, preferably not less than 5, and most preferably not less than 8.

If the ratio of the thickness of layer a to the thickness of layer b is less than about ¼, a membrane with a high flux value and a good mechanical strength is obtained.

The average particle size of and the amount of the fine particles in layer a may be different from those in layer b. The same or different polymers may be used for making layer a and layer b.

The present method of producing the membrane of the present invention will be explained hereinafter.

The membrane of the present invention is manufactured by stretching a formed material (a precursor) of a non-crystalline polymer and fine particles. The fine particles should preferably be dispersed uniformly in the precursor. If the distribution of the fine particles in the precursor greatly deviates from a uniform distribution, the uniform stretching of the precursor at the following step tends to become difficult, and consequently the stretching to a high ratio, which is a requirement for obtaining a stacked construction of the slit-like micropores, tends to become difficult.

The mixing ratio of the non-crystalline polymer to the fine particles should preferably be 40–95 wt. %: 60–5 wt. %, more preferably 40–90 wt. %: 60–10 wt. %, and most preferably 40–85 wt. %: 60–15 wt. %. If the formed material has this mixing ratio, the stretching at the following stage may be effectively conducted to enable the formation of the membrane of the present invention.

The average particle size of the fine particles should preferably be of from 0.01 to 10 μm, and more preferably from 0.1 to 5 μm. If the average particle size is smaller than 0.01 μm, it tends to become more difficult to obtain the stacked microporous structures as intended by the stretching. On the other hand, if the size exceeds 10 μm, the width of the slit-like micropores formed after the stretching becomes too wide. In this case, the mechanical strength of the membrane tends to decrease and the membrane formed tends to break during its use.

The mixing method of the non-crystalline polymer and the fine particles is not limited, and any conventional mixing method may be used. For example, these two materials may be mixed with a mixing machine like a Henshell machine. A single-screw or double-screw extruder may be used to melt-mix it to obtain pellets.

Thereafter the mixed material is subjected to a formation step to make the precursor, and any formation method may be used. In case a planar membrane, such as a film-like or sheet-like membrane, is to be formed, a method, such as a melt-extruding process with the use of a T-dye, a compressing process, and a casting formation method, may be used. In case a hollow fiber membrane is to be formed, a melt spinning process is used with the use of any conventional spinneret such as a double-tubular construction spinneret or a bridge-type construction spinneret.

The temperature for this formation should preferably be chosen from the range of from a glass transition temperature (Tg) of the non-crystalline polymer to a temperature of (Tg+200° C.), in order to stably produce the precursor.

In case the membrane of the present invention takes a form of a hollow fiber membrane, the fiber spun from the spinneret should preferably be drawn with a low draw ratio of from 1 to 200, more preferably from 5 to 100, and most preferably from 10 to 50. The drawn hollow fibers, drawn with a ratio within these ranges, have a uniform and appropriate degree of orientation. These drawn hollow fibers will enable a smooth stretching at the stretching step following, and the production of the membrane which has properties aimed at in the present invention.

The thus-drawn hollows fibers are then stretched. This stretching is usually conducted in the lengthwise direction of the spun fibers. By this stretching, the microporous membrane of the present invention is obtained.

One of the characteristics of the method of the present invention is to stretch the precursor containing the fine particles, and by this stretching microfibrils and slit-like micropores are oriented in the lengthwise direction of the membrane within the membrane from the points of location of the fine particles in the precursor. By this stretching, voids and crazes are generated from the portions of the fine particles, and these voids and crazes will be transformed into the slit-like micropores with the progress of the stretching. Simultaneously, the molecular chains of the non-crystalline polymer are stretched to generate the microfibrils, and the microfibrils and the slit-like micropores are oriented in the stretching direction of the membrane. In case the membrane takes a form of a hollow fiber membrane, the lengthwise direction of the microfibrils and slit-like micropores is identical to the fiber axis of the membrane, since the stretching of the fibers is conducted in the direction of fiber's axis.

In the precursor, the fine particles are uniformly distributed in the non-crystalline polymer, and thus the slit-like micropores have a stacked construction in the direction of the thickness of the membrane, and they communicate from one wall surface to the other wall surface of the membrane.

Since the membrane of the present invention has, within its wall, a stacked construction of the microfibrils and slit-like micropores, it has a higher flux value and a higher mechanical strength in comparison with those of a non-symmetrical microporous membrane produced by the wet formation method. The width of the slit-like micropores depends on the particle size of the fine particles in the precursor. The length of the slit-like micropores depends on the ratio of the precursor. Thus, a proper control of the particle size of the fine particles in the precursor, the distribution of the particle size, and the stretching ratio of the precursor, enables a precise control of the width and length of the slit-like micropores within the microporous membrane.

The stretching temperature for the precursor should preferably be higher than the Tg of the non-crystalline polymer, such as a temperature of from Tg to (Tg+100° C.), more preferably a temperature of from TG to (Tg+50° C.), and most preferably a temperature of from (Tg+5° C.) to (Tg+30° C.). By conducting the stretching of the precursor at a temperature within those ranges, the stretching can be smoothly conducted, and the stacked construction of the microfibrils and slit-like micropores can be effectively formed within the wall of the membrane.

In case a stretching ratio is not higher than 1.5, a stretching temperature below the Tg of the non-crystalline polymer may be employed, but in this case a second stretching at a temperature higher than the Tg is further conducted.

When the precursor is stretched, it is necessary that its deformation rate be not lower than 200 %/min. It should preferably be not lower than 500 %/min., more preferably not lower than 1,000 %/min., and most preferably 3,000 %/min. In case a stretching is conducted at a deformation rate within these ranges, a uniform stretching is possible.

The breakage of the fibers during the stretching step rarely happens, and a stable stretching of a high stretching ratio becomes possible.

In case a hollow fiber membrane precursor spun with a low draw ratio is stretched at a deformation rate stated above, a hollow fiber membrane with a good shape retention may be produced.

An important characteristic of the present method is that the precursor comprising the non-crystalline polymer and the fine particles dispersed in the precursor may be stably stretched to a high stretching ratio to produce the membrane of the present invention, if the deformation rate during stretching is not lower than 200 %/min.

This stretching is continuously conducted by the use of rollers. In case a deformation rate of from not lower than 200 %/min. to lower than 1,000 %/min. is employed, a multi-step stretching, such as two-step stretching, is preferably employed. In case a deformation rate is higher than 1,000 %/min., the zone stretching method should preferably be employed. Any combination of the zone stretching and the multi-stage stretching may also be employed.

In case the membrane is a hollow fiber membrane, a hollow fiber precursor which is spun at a low draw ratio should preferably be used, since it is excellent in form retention.

The stretching of the precursor should preferably be of from 100 to 900% (i.e., the stretching to a length of from 2.0 to 10.0 times the length before stretching), and more preferably from 200 to 800% (i.e., a stretching to a length of from 3.0 to 9.0 times the length before stretching). To obtain a microporous membrane with a good flux value the stretching ratio of the precursor should preferably be from 300 to 800 % (i.e., the stretching to a length of from 4.0 to 9.0 times the length before stretching).

By stretching the precursor by 100% or more, the slit-like micropores generated within the microporous membrane are connected with each other, and the micropores within the wall communicate from the one wall surface of the membrane to the other wall surface of the membrane.

If a microporous membrane has a planar shape, the precursor may be subjected to a monoaxial or biaxial stretching. To obtain a membrane with a higher mechanical strength, a biaxial stretching should preferably be employed. If desired, the thus-stretched membrane is subjected to a heat-setting step at a temperature not lower than the Tg of the non-crystalline polymer used to prepare the membrane.

By the method as explained above, the membrane of the present invention may become a membrane with a good flux value and a good mechanical strength and having a structure wherein the microfibrils and the slit-like micropores are stacked in the direction of the thickness of the membrane, and the slit-like micropores communicate from the one wall surface to the other surface of the membrane.

The thus-produced membrane of the present invention contains fine particles within its wall. The membrane may be used without eliminating the fine particles, or it may be used with the elimination of the fine particles by extraction. The membrane containing the fine particles has a higher heat-resistance, a higher pressure-resistance, and a higher mechanical strength, in comparison with a membrane which does not contain the fine particles.

To prevent the drop or elution of the fine particles from the membrane during the use, a proper selection of a fine particle, and a surface treatment of the fine particle, should preferably be conducted.

The microporous membrane after the extraction of the fine particles in the membrane becomes a membrane with a higher flux value in comparison with a membrane before the extraction. The risk of the drop or elution of the fine particles from the membrane during the use substantially decreases.

The extraction of the fine particles in the membrane may preferably be conducted by treating the membrane with an extraction agent. Any extraction agent, such as an acidic aqueous solution, an alkaline aqueous solution, an organic solvent, and any other solvent, may be used, if it may dissolve the fine particles but it does not dissolve the non-crystalline polymer. For safety and sanitary reasons, aqueous extraction agents should preferably be used.

The extraction conditions should preferably be changed depending on the kinds of fine particles and the solvency power of the extraction agent. A higher extraction temperature, a higher concentration of the extraction agent, and a longer extraction time should be chosen in comparison with the condition for extracting the fine particles which are exposed. The extraction may be conducted by dipping the membrane and keeping it stationary in the extraction bath. In order to accelerate the extraction, the extraction agent in the bath should preferably be stirred, or the membrane should preferably be shaken in the extraction bath.

The membrane of the present invention may take any form, depending on its areas of application, but it is usually a planar membrane or a hollow fiber membrane. If it takes a form of a hollow fiber membrane, the outer diameter should preferably be not larger than 2 mm, and more preferably from 20 to 1,000 μm. The wall thickness of the membrane should preferably be not less than 500 μm, and more preferably be from 5 to 400 μm. If the outer diameter exceeds 2 mm, it tends to become difficult to keep the shape of the hollow fiber membrane during its use, and the membrane tends to become flat by the pressure externally applied to the membrane. If the outer diameter becomes less than 20 μm, fiber breakage tends to happen during the production of the membrane.

If the membrane takes a planar membrane shape, the wall thickness of the membrane should preferably be from 5 to 500 μm, and more preferably be from 5 to 400 μm.

If a hydrophilic liquid is treated with the membrane of the present invention, the membrane should preferably be coated with a hydrophilic polymer. Examples of the hydrophilic polymer are polyethyleneglycol, polypropylene glycol, a ethylene oxide-propylene oxide copolymer, a polyacrylamide, polyvinyl pyrrolidone, an ethylene-vinyl acetate copolymer, an ethylene-vinyl alcohol copolymer, and a phydrophilic copolymer of a diacetone acrylamide monomer and a crosslinking monomer. Among these examples, an ethylene-vinyl alcohol copolymer containing an ethylene of from 20 to 70 mole % is most preferable to obtain a hydrophilic microporous membrane with a good durability.

The hydrophilic treatment of the membrane is conducted as follows: First, an appropriate amount of an ethylene-vinyl alcohol copolymer is dissolved in a mixed solvent of water and ethanol containing in ethanol solution containing the copolymer of not more than 2 wt. %, preferably not more than 1.5 wt. %. After dipping the microporous membrane in this solution, the microporous membrane is taken up, and then the membrane is subjected to the drying process to remove the solvent on the solution on the surface of the membrane to obtain a hydrophilic microporous membrane. By this treatment, several microfibrils are bundled together, and the shape of the slit-like micropores in the membrane is changed to a elliptical-shape, and the performance of the membrane for treating hydrophlic liquids is greatly enhanced.

The hydrophilic crosslinked copolymer of a diacetone acrylamide monomer and a crosslinking monomer is a copolymer containing diacetone acrylamine of not less than 50 wt. % and a crosslinking monomer. The hydrophilic copolymer may contain one or more non-crosslinking monomers.

The crosslinking monomer is a monomer containing not less than 2 unsaturated bonds, such as vinyl bonds and allyl bonds, which are polymerizable with diacetone acrylamide. Another example of this crosslinking monomer is a monomer which contains an unsaturated bond, such as a vinyl or allyl bond, and a functional group which may generate a chemical bond by, for example, a condensation reaction, and which may be dissolved in the solvents for diacetone acrylamide.

Examples of another crosslinking monomer are N,N-methylenebisacrylamide, N-hydroxymethyl(meth)acrylamide, triallylcyanurate, triallylisocyanulate, divinyl benzene, 2,2-bis(4-methacryloylpolyethoxyphenyl)propane, ethylene di(meth)acrylate, polyethleneglycol di(meth)acrylate, trimethylolpropanetri(meth)acrylate, pentaerythritoltetra(meth)acrylate, and trimethylolethanetri(meth)acrylate.

If the degree of the hydrophilic nature of the polymer becomes larger, the water permeability of the hydrophilic microporous membrane becomes better, and water starts to permeate uniformly through the overall surface of the membrane shortly after the initiation of its use. Thus, a water-soluble crosslinking monomer, which is sufficiently hydrophilic, is preferable as the crosslinking monomer for making the hydrophilic crosslinked polymer.

The water-soluble crosslinking monomer means a crosslinking monomer having a solubility of 1.0 g/dl to water at 30° C., and examples of it are N,N-methylenebisacrylamide, N-hydroxymethyl(meth)acrylamide, and others.

The application of the hydrophilic crosslinked polymer onto the surface of the micropores may be conducted by first applying the solution of the monomers onto the surface of the micropores, removing the solvent from the solution by drying, and then polymerizing the monomers on the surface of the micropores. A polymerization, such as thermal polymerization, a photopolymerization, a radiation polymerization, and a plasma polymerization may be employed.

By the methods stated above, it is possible to obtain a microporous membrane made of a non-crystalline polymer, wherein at least a part of the surface of the micropores within the wall of the membrane of the present invention are covered with a thin film of the ethylene-vinyl alcohol copolymer, or covered by the hydrophilic crosslinked polymer obtained by polymerizing diacetone acrylamide and the crosslinking monomer. This microporous membrane has a merit in that the fine particles in the membrane do not drop or eluate from the membrane during its use.

The ethylene-vinyl alcohol copolymer or the hydrophilic crosslinked polymer may also be applied onto the surface of the micropores of the membrane, after the fine particles in the membrane are removed by extraction.

EXAMPLES

The present invention will be explained in further detail with reference to the following nonlimiting examples.

In the following examples, the properties of the membrane were obtained according to the following methods.

1. Air Permeability Rate (AFR) and Water Permeability Rate (WFR) AFR and WFR were obtained by the equations below.

$$AFR = AF \times t$$

$$WFR = WF \times t$$

In the above, AF, WF, and t mean the following:
t(μm)=thickness of the membrane wall 2. Porosity (vol. %)

The porosity was obtained by the formula below.

$$\text{Porosity(vol. \%)} = \frac{\text{pore volume}}{\text{bulk volume of the membrane}} \times 100$$

The pore volume was measured using a mercury porosimeter. The bulk volume of the membrane was obtained by the dimension of the sample.

3. Maximum Pore Diameter According to the Bubble Point Method

The maximum pore diameter was obtained in accordance with ASTM F316-70.

4. Average Pore Diameter According the Mean Flow Pore Test

The average pore diameter was obtained in accordance with ASTM F316-86.

$AF(l/m^2.hr.0.5\ kg.cm^{-2})$=air permeability rate obtained from the measured value of the amount of air that permeates through the membrane when air with a pressure of 0.5 $kg.cm^{-2}$ is applied at 25° C. to one surface of the microporous membrane.

$WF(l/m^2.hr.mmHg)$=water permeability rate obtained from the measured value of the amount of water that permeates through the membrane when a differential pressure of 50 mmHg is applied to the surface of the microporous membrane.

The micropores used in the present invention is hydrophobic, and is difficult to wet the surface of the micropores. Thus, before measuring the water permeability rate, the microporous membrane was subjected to a hydrophilic treatment by dipping the membrane in ethanol and substituting it with water.

EXAMPLE 1

A pellet was obtained by mixing 70 wt. % of a polysulfone ("UDEL P-3500," manufactured by Amoco Japan Ltd.: Tg about 195° C.) and 30 wt. % of a crosslinked silicone fine particle having a number average particle size of 0.8 μm ("TOSUPEARL 108," manufactured by Toshiba Silicone K.K.), and kneading the thus-mixed composition at 330° C. with a double-screw extruder.

The thus-obtained pellet was spun using a spinneret having a double-tubular construction at a spinning temperature of 330° C. and at an extruding line speed of 10 cm/min. The spun fiber was taken up at a take-up speed of 5 m/min. at a spinning draw ratio of 50. Then the thus-obtained unstretched hollow fiber was hot-stretched at 205° C. and at a deformation rate of 5,000 %/min. until the total stretching was 400%.

The thus-obtained polysulfone microporous hollow fiber membrane had an outer diameter of 410 μm, and a membrane thickness of 30 μm. The outer surface, the inner surface, and the crosssection of the hollow fiber, were observed with a scanning electron microscope, and it was observed that the slit-like micropores having an average width of 0.5 μm and an average length of 5 μm were oriented in the lengthwise direction of the membrane, that they communicated from one surface to the other surface of the membrane, and that the membrane had a uniform structure in the direction of the thickness.

Figure 2:
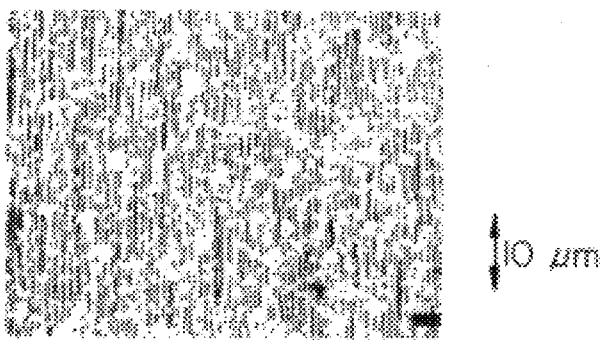
FIG. 2 is a scanning electron photomicrograph (×1,000) showing the inner wall surface of the polysulfone microporous hollow fiber membrane obtained in Example 1.

The experimental results are shown in Table 1. FIGS. 1 and 2 are scanning electron photomicrographs of the hollow fiber membrane.

EXAMPLE 2

A pellet was obtained by mixing 50 wt. % of a polysulfone ("UDEL P-3500," manufactured by Amoco Japan Ltd.) and 50 wt. % of surface-treated calcium carbonate having an average particle size of 1 μm ("LITON P.O. 220 B-10," manufactured by Bihoku-Funka Kogyo K.K.) and kneading the thus-mixed composition at 330° C. with a double-screw extruder.

The thus-obtained pellet was spun using a spinneret having a double-tubular construction at a spinning temperature of 350° C. and at an extruding line speed of 10 cm/min. The spun fiber was taken up at a take-up speed of 2.5 m/min. at a spinning draw ratio of 25. Then the thus-obtained unstretched hollow fiber was hot-stretched at 205° C. and at a deformation rate of 5,000 %/min. until the total stretching was 700%. The thus-obtained polysulfone microporous hollow fiber membrane had an outer diameter of 410 μm, an inner diameter of 300 μm, and a membrane thickness of 55 μm. The outer surface, the inner surface, and the cross section of the hollow fiber, were observed with a scanning electron microscope, and it was observed that the slit-like micropores having an average width of 0.6 μm and an average length of 12 μm were oriented in the lengthwise direction, that they communicated from the outer surface to the inner surface, and that the membrane had a uniform structure in the direction of the thickness.

The experimental results are shown in Table 1.

Figure 3:
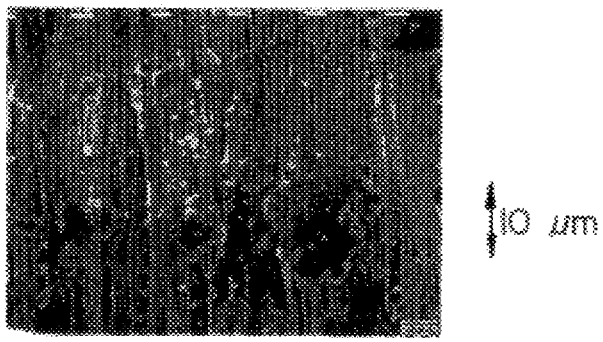
FIG. 3 is a scanning electron photomicrograph (×1,000) showing the outer surface of the polysulfone microporous hollow fiber membrane obtained in Example 2.

FIG. 3 is scanning electron photomicrograph.

EXAMPLE 3

The polysulfone hollow fiber membrane obtained in EXAMPLE 2 was dipped in a HCl solution of 1 normality at room temperature for 24 hours to extract the calcium carbonate particles in the membrane.

Figure 4:
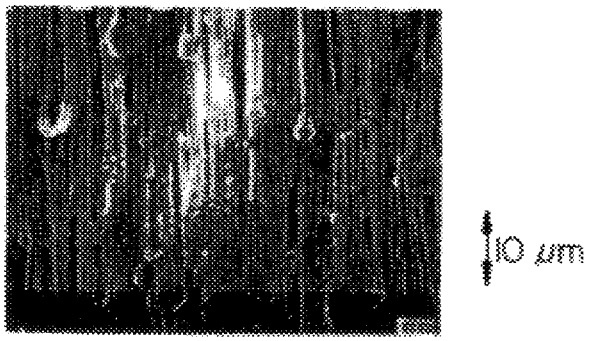
FIG. 4 is a scanning electron photomicrograph (×1,000) showing the outer surface of the polysulfone microporous hollow fiber membrane obtained in Example 3.

The experimental results obtained are shown in Table 1. FIG. 4 is a scanning electron photomicrograph of the hollow fiber membrane obtained.

EXAMPLE 4

A microporous hollow fiber membrane was obtained by employing the same conditions as those employed in EXAMPLE 1, except that a crosslinked silicone fine particle having an average particle size of 2.0 μm ("TOSUPEARL 120," manufactured by Toshiba Silicone K.K.) was used. The thus-obtained polysulfone microporous hollow fiber membrane had an outer diameter of 500 μm, an inner diameter of 430 μm, and a membrane thickness of 35 μm. By the observation of the scanning electron microscope, slit-like micropores having an average width of 2 μm and an average length of 15 μm were observed.

The experimental results are shown in Table 1.

EXAMPLE 5

A pellet was obtained by mixing 80 wt. % of a polysulfone ("UDEL P-3500," manufactured by Amoco Japan Ltd.) and 20 wt. % of crosslinked silicone fine particles having an average particle size of 0.3 μm ("TOSUPEARL 103," manufactured by Toshiba Silicone K.K.) and kneading the thus-mixed composition at 330° C. with a double-screw extruder.

The thus-obtained pellet was spun using a spinneret having a double-tubular construction at a spinning temperature of 330° C. and at an extruding line speed of 10 cm/min. The spun fiber was taken up at a take-up speed of 4 m/min. at a spinning draw ratio of 40. Then the thus-obtained unstretched hollow fiber was hot-stretched at 205° C. and at a deformation rate of 5,000 %/min. until the total stretching was 300 %. The thus-obtained polysulfone microporous hollow fiber membrane had an outer diameter of 360 μm, an inner diameter of 200 μm, and a membrane thickness of 80 μm. The outer surface, the inner surface, and the cross section of the hollow fiber, were observed with a scanning electron microscope, and it was observed that the slit-like micropores having an average width of 0.3 μm and an average length of 2 μm were oriented in the lengthwise direction, that they communicated from the outer surface to the inner surface, and that the membrane had a uniform structure in the direction of the thickness.

The experimental results are shown in Table 1.

FIG. 3 is a scanning electron photomicrograph of the hollow fiber membrane obtained.

EXAMPLE 6

70 parts by weight of a polysulfone ("UDEL P-3500," manufactured by Amoco Japan Ltd.), 30 parts by weight of crosslinked silicone fine particles having an average particle size of 2.0 μm ("TOSUPEARL 120," manufactured by Toshiba Silicone K.K.), and 280 parts by weight of 1,2-dichloroethane, were blended and stirred for 5 hours. The thus-obtained solution was cast on a glass plate and was dried in a $N_2$ stream for 24 hours to obtain a film.

The thus-obtained film was hot-stretched in one direction at 205° C. and at a deformation rate of 3,000 %/min. until the total stretch was 500%, to obtain a polysulfone microporous planar membrane. The thickness of the membrane obtained was 52 μm.

Figure 5:
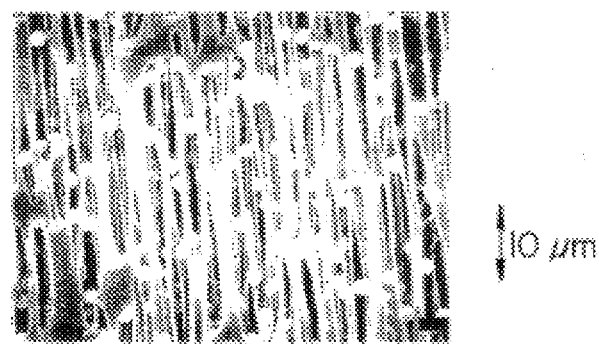
FIG. 5 is a scanning electron photomicrograph (×1,000) showing a wall surface of the polysulfone planar microporous membrane obtained in Example 6.

It was observed with a scanning election microscope that the planar membrane had slit-like micropores of an average width of 2.1 μm and an average length of 18 μm. FIG. 5 is a scanning electron photomicrograph of the surface of the planar membrane.

The experimental results are shown in Table 1.

EXAMPLE 7

A pellet was obtained by mixing 60 wt. % of a polyethersulfone ("RADEL A-100," manufactured by Amoco Japan Ltd.: Tg about 225° C.) and 40 wt. % of crosslinked silicone fine particles having an average particle size of 0.8 μm ("TOSUPEARL 108," manufactured by Toshiba Silicone K.K.) and kneading the thus-mixed composition at 380° C. with a double-screw extruder.

The thus-obtained pellet was spun using a spinneret having a double-tubular construction at a spinning temperature of 380° C. and at an extruding line speed of 10 cm/min. The spun fiber was taken up at a take-up speed of 2.0 m/min. at a spinning draw ratio of 20. Then the thus-obtained unstretched hollow fiber was hot-stretched at 230° C. and at a deformation rate of 1,000 %/min. until the total stretching was 200%. The thus-obtained polysulfone microporous hollow fiber membrane had an outer diameter of 920 μm, an inner diameter of 610 μm, and a membrane thickness of 155

μm. The outer surface, the inner surface, and the cross section of the hollow fiber, were observed with a scanning electron microscope, and it was observed that slit-like micropores having an average width of 0.5 μm and an average length of 4 μm were oriented in the lengthwise direction, that they communicated from the outer surface to the inner surface, and that the membrane had a uniform structure in the direction of the thickness.

The experimental results are shown in Table 1.

EXAMPLE 8

A pellet was obtained by mixing 50 wt. % of a polyethersulfone ("RADEL A-100," manufactured by Amoco Japan Ltd.: Tg about 225° C.) and 50 wt. % of silica fine particles having an average particle size of 1.7 μm ("ADOMAFINE SO-C5," manufactured by ADOMATECHS K.K.) and kneading the thus-mixed composition at 380° C. with a double-screw extruder.

The thus-obtained pellet was spun using a spinneret having a double-tubular construction at a spinning temperature of 380° C. and at an extruding line speed of 10 cm/min. The spun fiber was taken up at a take-up speed of 2.0 m/min. at a spinning draw ratio of 20. Then the thus-obtained unstretched hollow fiber was hot-stretched at 230° C. and at a deformation rate of 4,000 %/min. until the total stretching was 400%. The thus-obtained polysulfone microporous hollow fiber membrane had an outer diameter of 800 μm, an inner diameter of 600 μm, and a membrane thickness of 100 μm. The outer surface, the inner surface, and the cross section of the hollow fiber were observed with a scanning electron microscope, and it was observed that slit-like micropores having an average width of 1.5 μm and an average length of 15 μm were oriented in the orientation direction, that they communicated from the outer surface to the inner surface, and that the membrane had a uniform structure in the direction of the thickness.

The experimental results are shown in Table 1.

EXAMPLE 8

A pellet was obtained by mixing 60 wt. % of a polyethersulfone ("RADEL A-100," manufactured by Amoco Japan Ltd.: Tg about 225° C.) and 40 wt. % of alumina fine particles having an average particle size of 0.7 μm ("ADOMAFINE AO-502," manufactured by ADOMATECHS K.K.) and kneading the thus-mixed composition at 380° C. with a double-screw extruder.

The thus-obtained pellet was spun using a spinneret having a double-tubular construction at a spinning temperature of 380° C. and at an extruding line speed of 10 cm/min. The spun fiber was taken up at a take-up speed of 2.0 m/min. at a spinning draw ratio of 20. Then the thus-obtained unstretched hollow fiber was hot-stretched at 230° C. and at a deformation rate of 4,000 %/min. until the total stretching was 400%. The thus-obtained polysulfone microporous hollow fiber membrane had an outer diameter of 480 μm, an inner diameter of 300 μm, and a membrane thickness of 90 μm. The outer surface, the inner surface, and the cross section of the hollow fiber were observed with a scanning electron microscope, and it was observed that slit-like micropores having an average width of 0.5 μm and an average length of 5 μm were oriented in the lengthwise direction, that they communicated from the outer surface to the inner surface, and that the membrane had a uniform structure in the direction of the thickness.

The experimental results are shown in Table 1.

EXAMPLE 10

A pellet was obtained by mixing 70 wt. % of a polyallylsulfone ("RADEL R-5000," manufactured by Amoco Japan Ltd. Tg about 230° C.) and 30 wt. % of crosslinked silicone fine particles having an average particle size of 0.8 μm ("TOSUPEARL 108," manufactured by Toshiba Silicone K.K.) and kneading the thus-mixed composition at 400° C. with a double-screw extruder.

The thus-obtained pellet was spun using a spinneret having a double-tubular construction at a spinning temperature of 400° C. and at an extruding line speed of 10 cm/min. The spun fiber was taken up at a take-up speed of 1 m/min. at a spinning draw ratio of 10. Then the thus-obtained unstretched hollow fiber was hot-stretched at 240° C. and at a deformation rate of 3,000 %/min. until the total stretching was 800%. The thus-obtained polysulfone microporous hollow fiber membrane had an outer diameter of 300 μm, an inner diameter of 220 μm, and a membrane thickness of 40 μm. The outer surface, the inner surface, and the cross section of the hollow fiber, were observed with a scanning electron microscope, and it was observed that slit-like micropores having an average width of 0.5 μm and an average length of 20 μm were oriented in the lengthwise direction, that they communicated from the outer surface to the inner surface, and that the membrane had a uniform structure in the direction of the thickness.

Figure 6:
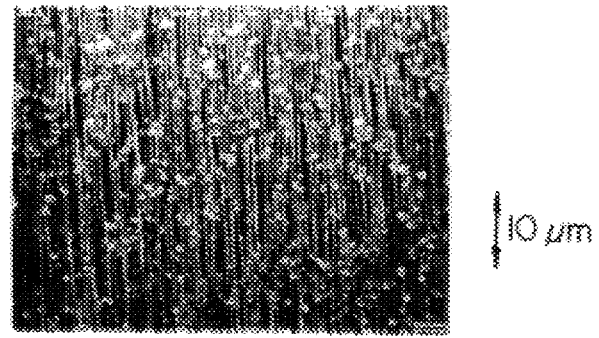
FIG. 6 is a scanning electron photomicrograph (×1,000) showing the outer surface of the polyallylsulfone microporous hollow fiber membrane obtained in Example 8.

FIG. 6 is a scanning electron photomicrograph of the membrane.

The experimental results are shown in Table 1.

EXAMPLE 11

A pellet was obtained by mixing 70 wt. % of a polyallyesulfone ("RADEL R-5000," manufactured by Amoco Japan Ltd.) and 30 wt. % of titanium dioxide fine particles having an average particle size of 0.24 μm (TIPAQUE R-630, manufactured by Ishihara Sangyo K.K.) and kneading the thus-mixed composition at 400° C. with a double-screw extruder.

The thus-obtained pellet was spun using a spinneret having a double-tubular construction at a spinning temperature of 400° C. and at an extruding line speed of 10 cm/min. The spun fiber was taken up at a take-up speed of 1.5 m/min. at a spinning draw ratio of 15. Then the thus-obtained unstretched hollow fiber was hot-stretched at 240° C. and at a deformation rate of 3,000 %/min. until the total stretching was 400%. The thus-obtained polysulfone microporous hollow fiber membrane had an outer diameter of 700 μm, an inner diameter of 560 μm, and a membrane thickness of 70 μm. The outer surface, the inner surface, and the cross section of the hollow fiber were observed with a scanning electron microscope, and it was observed that slit-like micropores having an average width of 0.2 μm and an average length of 2.5 μm were oriented in the lengthwise direction, that they communicated from the outer surface to the inner surface, and that the membrane had a uniform structure in the direction of the thickness.

The experimental results are shown in Table 1.

EXAMPLE 12

A pellet was obtained by mixing 50 wt. % of a polyetherimide ("ULTEM 1000" manufactured by General Electric Company) and 50 wt. % of surface-treated calcium carbonate having an average particle size of 1 μm ("LITON P.O. 220 B-10," manufactured by Bihoku-Funka Kogyo K.K.) and kneading the thus-mixed composition at 350° C. with a double-screw extruder.

The thus-obtained pellet was spun using a spinneret having a double-tubular construction at a spinning temperature of 370° C. and at an extruding line speed of 10 cm/min. The spun fiber was taken up at a take-up speed of 2.5 m/min. at a spinning draw ratio of 25. Then the thus-obtained unstretched hollow fiber was hot-stretched at 230° C. and at a deformation rate of 5,000 %/min. until the total stretching was 700%. The thus-obtained polysulfone microporous hollow fiber membrane had an outer diameter of 430 µm, an inner diameter of 320 µm, and a membrane thickness of 55 µm. The outer surface, the inner surface, and the cross section of the hollow fiber were observed with a scanning electron microscope, and it was observed that slit-like micropores having an average width of 1 µm and an average length of 14 µm were oriented in the lengthwise direction, that they communicated from the outer surface to the inner surface, and that the membrane had a uniform structure in the direction of the thickness.

The experimental results are shown in Table 1.

FIG. 3 is scanning electron photomicrograph.

EXAMPLE 13

The hollow fiber membrane obtained in Example 12 was dipped in a HCl solution of 1 normality for 24 hours, and the calcium carbonate fine particles were extracted.

The experimental results are shown in Table 1.

EXAMPLE 14

A pellet was obtained by mixing 70 wt. % of a polyarylate ("U-POLYMER U-100," manufactured by Unichika K.K.) and 30 wt. % of crosslinked silicone fine particles having an average particle size of 0.81 µm ("TOSPEARL 108," manufactured by Toshiba Silicone K.K.) and kneading the thus-mixed composition at 330° C. with a double-screw extruder.

The thus-obtained pellet was spun using a spinneret having a double-tubular construction at a spinning temperature of 330° C. and at an extruding line speed of 10 cm/min. The fiber spun was taken up at a take-up speed of 2.5 m/min. at a spinning draw ratio of 25. Then the thus-obtained unstretched hollow fiber was hot-stretched at 205° C. and at a deformation rate of 5,000 %/min. until the total stretching was 700%. The thus-obtained polysulfone microporous hollow fiber membrane had an outer diameter of 420 µm, an inner diameter of 300 µm, and a membrane thickness of 60 µm. The outer surface, the inner surface, and the cross section of the hollow fiber were observed with a scanning electron microscope, and it was observed that slit-like micropores having an average width of 0.9 µm and an average length of 13 µm were oriented in the lengthwise direction, that they communicated from the outer surface to the inner surface, and that the membrane had a uniform structure in the direction of the thickness.

The experimental results are shown in Table 1.

EXAMPLE 15

A pellet was obtained by mixing 50 wt. % of a methylmethacrylate polymer ("ACRYPET VH," manufactured by Mitsubishi Rayon K.K.: Tg about 100° C.) and 50 wt. % of surface-treated calcium carbonate having an average particle size of 1 µm ("LITON P.O. 220 B-10," manufactured by Bihoku-Funka Kogyo K.K.) and kneading the thus-mixed composition at 230° C. with a double-screw extruder.

The thus-obtained pellet was spun using a spinneret having a double-tubular construction at a spinning temperature of 230° C. and at an extruding line speed of 10 cm/min. The spun fiber was taken up at a take-up speed of 2.5 m/min. at a spinning draw ratio of 25. Then the thus-obtained unstretched hollow fiber was hot-stretched at 110° C. and at a deformation rate of 5,000 %/min. until the total stretching was 700%. The thus-obtained polysulfone microporous hollow fiber membrane had an outer diameter of 350 µm, an inner diameter of 270 µm, and a membrane thickness of 40 µm. The outer surface, the inner surface, and the cross section of the hollow fiber were observed with a scanning electron microscope, and it was observed that slit-like micropores having an average width of 0.9 µm and an average length of 13 µm were oriented in the orientation direction, that they communicated from the outer surface to the inner surface, and that the membrane had a uniform structure in the direction of the thickness.

The experimental results are shown in Table 1.

EXAMPLE 16

A pellet was obtained by mixing 75 wt. % of a copolymer of methylmethacrylate and methacrylic acid which was obtained by a usual radical polymerization (methylmethacrylate/methacrylic acid=97 wt./3 wt.: Tg about 100° C.) and 25 wt. % of benzoguanamine fine particles having an average particle size of 3 µm ("EPOSTAR M-30," manufactured by Nippon Shokubai Kagaku Kogyo K.K.) and kneading the thus-mixed composition at 230° C. with a double-screw extruder.

The thus-obtained pellet was spun using a spinneret having a double-tubular construction at a spinning temperature of 230° C. and at an extruding line speed of 10 cm/min. The spunfiber was taken up at a take-up speed of 2.5 m/min. at a spinning draw ratio of 25. Then the thus-obtained unstretched hollow fiber was hot-stretched at 110° C. and at a deformation rate of 5,000 %/min. until the total stretching was 500%. The thus-obtained polysulfone microporous hollow fiber membrane had an outer diameter of 480 µm, an inner diameter of 400 µm, and a membrane thickness of 40 µm. The outer surface, the inner surface, and the cross section of the hollow fiber were observed with a scanning electron microscope, and it was observed that slit-like micropores having an average width of 2.8 µm and an average length of 24 µm were oriented in the lengthwise direction, that they communicated from the outer surface to the inner surface, and that the membrane had a uniform structure in the direction of the thickness.

The experimental results are shown in Table 1.

EXAMPLE 17

The microporous hollow fiber membrane obtained in Example 1 was dipped in a mixed solvent of 60 wt. % of ethanol and 40 wt. % of water containing 1.5wt. % of an ethylene-vinyl alcohol copolymer, pre-dried in a $N_2$ atmosphere of 60° C., and then dried at 50° C.

The maximum diameter by the bubble point method, an average pore diameter by the air flow method, and WFR of the hydrophilic membrane obtained in this example, were 0.6 µm, 0.37 µm, and $4.0 \times 10^2$ µm. l/m².hr.mmHg. A separation module having an effective length of 10 cm was prepared by bundling 100 fibers of the hollow fiber obtained in a U-shape, and fixing its terminal portions to the housing with a resin. Excellent water permeability was observed when water was passed through this module at a low water pressure of 0.2 kg/cm². The shrinkage factor after subjecting the hollow fiber membrane of this example to an autoclave sterilizing treatment by steam of 121° C. for 30 minutes showed a very low value of 0.16%.

EXAMPLE 18

The microporous hollow fiber membrane obtained in Example 3 was dipped in a mixed solvent of 60 wt. % of ethanol and 40 wt. % of water containing 1.5wt. % of an ethylene-vinyl alcohol copolymer, pre-dried in an $N_2$ atmosphere of 60° C., and dried at 50° C.

The maximum diameter by the bubble point method, an average pore diameter by the air flow method, and WFR, were 1.6 µm, 0.9 µm, and $2.1 \times 10^3$ µm. l/m².hr.mmHg. A separation module having an effective length of 10 cm was prepared by bundling 100 fibers of the hollow fibers obtained in this example in a U-shape, and fixing its terminal portions to the housing with a resin. Excellent water permeability was observed when water was passed through this module at a low water pressure of 0.2 kg/cm².

The hollow fiber membrane was subjected to the same sterilizing treatment as that of Example 17, and the shrinkage factor was 0.21%, which was also very low.

COMPARATIVE EXAMPLE 1

A polypropylene with a high molecular weight manufactured by Mitsui Petrochemical K.K. was spun using a spinneret having a double tubular construction at a spinning temperature of 200° C. and a spinning draw ratio of 460. Then the thus-obtained unstretched hollow fiber was subjected to a heat treatment in heated air of 145° C. for 8 hours while keeping its length constant. This heat-treated hollow fiber was cold-stretched by 25% at a room temperature and then hot-stretched at 150° C. until the total stretching was 420%. Thereafter the stretched fiber was subjected to a heat set treatment at 152° C. while keeping the length of the fiber constant.

The thus-obtained hollow fiber membrane had an inner diameter of 310 µm and an outer diameter of 450 µm.

The hollow fiber membrane was dipped in a mixed solvent of 40 wt. % of ethanol and 60 wt. % of water containing 1.5 wt. % of an ethylene-vinyl alcohol copolymer, pre-dried in a $N_2$ atmosphere of 60° C., and dried at 50° C.

The maximum pore diameter by the bubble point method and the average pore diameter by the air flow method were 0.22 µm and 0.18 µm.

The hollow fiber membrane of this comparative example was subjected to the same sterilizing treatment as that of Example 17, and the shrinkage factor was 8.06%, which was very high.

EXAMPLE 19

The hollow fiber membrane obtained in Example 1 was dipped for 12 seconds in a solution of 100 parts by weight of diacetone acrylamide, 5 parts by weight of N-hydroxymethylacrylamride, 1 part by weight of benzoilperoside, and 1,000 parts by weight of acetone, and dried for 5 minutes in a $N_2$ atmosphere by blowing $N_2$. This hollow fiber membrane was then heated for 60 minutes at 65° C. in a $N_2$ atmosphere, was dipped for 10 minutes in an ethanol aqueous solution containing 50 wt. % of ethanol, and was subjected to an ultrasonic washing in hot water for 2 minutes to remove the unnecessary components. Then the washed membrane was dried with hot air, and thus a hydrophilic polyethylene composite hollow fiber membrane was obtained.

This hydrophilic hollow fiber showed a good wetability, and exhibited an excellent WFR value of $5.7 \times 10^2$ µm. l/ m² .hr.mmHg without any special hydrophilic treatment.

A cycle of a drying treatment and a wetting treatment of the hollow fiber membrane obtained in this example was repeated 10 times, but no decrease in the water permeability of the membrane was observed even after this repetition test.

TABLE 1

| Ex. No. | AFR (µm · l/m² · hr · 0.5 kg · cm⁻²) | WFR (µm · l/m² · hr · mmHg) | Porosity (vol. %) | Bubble Point Max. Pore Diameter (µm) | Average Pore Diameter (µm) | Tensile Breaking Strength (Kg f/cm²) | Tensile Breaking Elongation (%) |
|---|---|---|---|---|---|---|---|
| 1 | $2.8 \times 10^7$ | $4.3 \times 10^2$ | 81 | 0.66 | 0.4 | 250 | 10 |
| 2 | $5.3 \times 10^7$ | $1.8 \times 10^3$ | 81 | 1.1 | 0.7 | 180 | 8 |
| 3 | $6.2 \times 10^7$ | $2.0 \times 10^3$ | 91 | 1.2 | 0.8 | 150 | 9 |
| 4 | $9.0 \times 10^7$ | $5.0 \times 10^3$ | 85 | 1.8 | 1.5 | 300 | 9 |
| 5 | $8.0 \times 10^6$ | $6.0 \times 10^3$ | 60 | 0.21 | 0.1 | 220 | 15 |
| 6 | $1.0 \times 10^8$ | $5.2 \times 10^3$ | 82 | 1.9 | 1.6 | 260 | 8 |
| 7 | $1.0 \times 10^7$ | $1.1 \times 10^2$ | 69 | 0.23 | 0.15 | 270 | 17 |
| 8 | $7.0 \times 10^7$ | $3.1 \times 10^3$ | 75 | 1.5 | 1.2 | 240 | 13 |
| 9 | $2.9 \times 10^7$ | $4.4 \times 10^2$ | 75 | 0.6 | 0.4 | 220 | 14 |
| 10 | $5.6 \times 10^7$ | $1.5 \times 10^3$ | 87 | 1.6 | 0.6 | 170 | 7 |
| 11 | $1.5 \times 10^7$ | $2.2 \times 10^2$ | 65 | 0.25 | 0.18 | 230 | 10 |
| 12 | $6.2 \times 10^7$ | $2.0 \times 10^3$ | 83 | 1.2 | 0.8 | 300 | 9 |
| 13 | $7.2 \times 10^7$ | $2.4 \times 10^3$ | 75 | 1.8 | 1.0 | 250 | 10 |
| 14 | $5.7 \times 10^7$ | $1.6 \times 10^3$ | 81 | 1.6 | 0.7 | 190 | 18 |
| 15 | $6.0 \times 10^7$ | $1.9 \times 10^3$ | 81 | 1.1 | 0.8 | 750 | 14 |
| 16 | $1.6 \times 10^8$ | $9.0 \times 10^3$ | 45 | 2.2 | 1.8 | 620 | 10 |

What is claimed is:

1. A method of producing a microporous membrane made of a non-crystalline polymer having, within its wall, microfibrils and slit-like micropores which are oriented in the lengthwise direction of the membrane, wherein said slit-like micropores communicate from one surface to the other surface of the membrane, and form a stacked construction, and said non-crystalline polymer is at least one selected from the group consisting of polysulfone, polyimide, polyarylate, polycarbonate, polyphenylene oxide, polystyrene, polymethylmethacrylate, and copolymers thereof, said method comprising the steps of:

(1) mixing 40 to 95 wt. % of a non-crystalline polymer and 60 to 5 wt. % of fine particles having an average particle size of from 0.01 to 10 µm to make a mixed composition, (2) making a precursor from the mixed composition; and (3) stretching the precursor at a deformation rate of not less than 200 %/min.

2. A method of producing a microporous membrane according to claim 1, wherein a heat-setting step is further conducted after the stretching step.

3. A microporous membrane produced by the method of claim 2.

4. A microporous membrane produced by the method of claim 1.

5. A method according to claim 1, wherein in step (2) the precursor to said microporous membrane is formed at a temperature from the glass transition temperature (Tg) of said non-crystalline polymer to a temperature of Tg+200° C.

6. A method according to claim 1, wherein said fine particles have an average particle size of 0.1 to 5μ.

7. A method according to claim 1, wherein said fine particles have an average particle size of 60 to 15 wt %.

8. A method of producing a microporous hollow fiber membrane comprising the steps of:

(1) mixing 40 to 95 wt. % of at least one non-crystalline polymer selected from the group consisting of polysulfone, polyimide, polyarylate, polycarbonate, polyphenylene oxide, polystyrene, polymethylmethacrylate, and copolymers thereof and 60 to 5 wt. % of fine particles having an average particle size of from 0.01 to 10 μm to make a mixed composition;

(2) spinning the mixed composition through a nozzle to make a hollow fiber precursor;

(3) stretching the hollow fiber precursor at a deformation rate of not less than 200 %/min.

9. A method of producing a microporous hollow fiber membrane according to claim 8, wherein a heat-setting step is further conducted after the stretching step.

10. A microporous hollow fiber membrane produced by the method of claim 9.

11. A microporous hollow fiber membrane produced by the method of claim 8.

12. A method according to claims 1 or 8, wherein said fine particles are comprised of at least one member selected from the group consisting of crosslinked silicone resin, surface-treated calcium carbonate, calcium oxide, silica, alumina, aluminum sulfate, barium sulfate, talc, clay, titanium dioxide, a crosslinked polystyrene resin, a melamine resin, a methylmethacryalte resin, a crosslinked rubber and a benzoguanamine resin.

13. A method according to claims 1 or 8, wherein said fine particles are extractable from said membrane by an aqueous extraction agent.

* * * * *